United States Patent [19]
Weichel

[11] 3,884,422
[45] May 20, 1975

[54] DEVICE FOR CUTTING LEAF AND STALK MATERIAL

[76] Inventor: Ernst Weichel, Postfach 30, 7326 Heiningen, Germany

[22] Filed: Aug. 23, 1973

[21] Appl. No.: 391,024

Related U.S. Application Data
[63] Continuation of Ser. No. 202,614, Jan. 13, 1972, abandoned.

[52] U.S. Cl. ................................. 241/279; 83/112
[51] Int. Cl. ...................... B02c 18/06; B26d 3/28
[58] Field of Search .................. 241/186, 277, 279; 172/604; 99/544; 83/56, 112

[56] References Cited
UNITED STATES PATENTS

| | | | |
|---|---|---|---|
| 1,113,241 | 10/1914 | Niesz | 172/604 X |
| 2,136,607 | 11/1938 | Benjamin | 172/604 X |
| 3,472,298 | 10/1969 | Vinogradov | 241/277 |
| 3,509,925 | 5/1970 | Weichel | 241/186 |
| 3,568,743 | 3/1971 | Dulieu | 99/544 |

*Primary Examiner*—Willie G. Abercrombie
*Attorney, Agent, or Firm*—Toren and McGeady

[57] ABSTRACT

A device for cutting a mass of leaf and stalk material into elongated rope-like portions includes a hollow or cup-shaped cutting member which rotates about a central axis. A curvilinear cutting edge is formed on the outer periphery of the cutting member. At least one of the cutting members and the mass of material are moved relative to the other. An arcuate portion of the cutting edge is directed into the mass of material and the cutting member is oriented relative to the mass so that a rope-like portion is removed and is guided by the interior of the hollow member or by the concave shape of the cup-shaped member away from the mass. The cutting member can be supported for movement in both a horizontal and a vertical direction. Further, a plurality of cutting members can be supported in spaced relationship on a common support for cutting multiple rope-like portions from the mass of leaf and stalk material.

27 Claims, 6 Drawing Figures

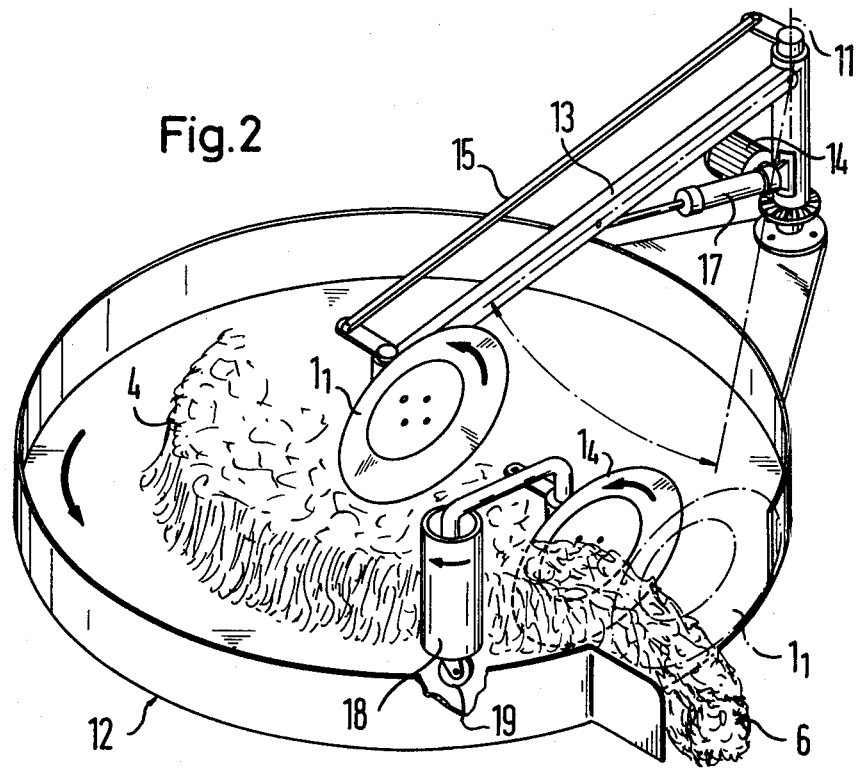
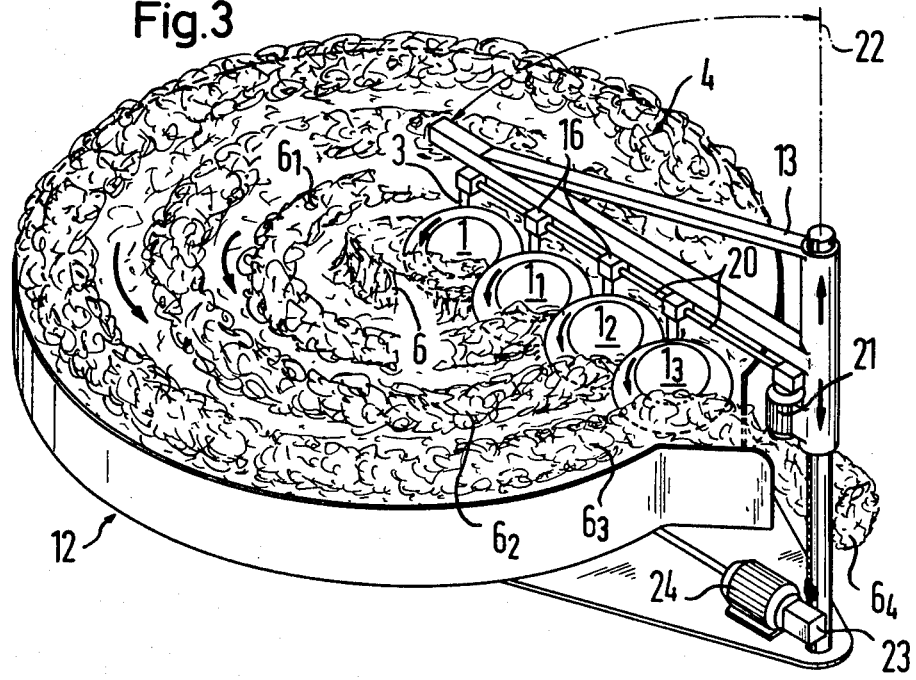

DEVICE FOR CUTTING LEAF AND STALK MATERIAL

This is a continuation of application Ser. No. 202,614 filed Jan. 13, 1972, now abandoned.

SUMMARY OF THE INVENTION

The present invention is directed to a device for cutting agricultural leaf and stalk material and, more particularly, it concerns a cutting member having a curvilinear cutting edge which is symmetrically disposed about an axis of rotation and the means for supporting and rotating the cutting member so that rope-like portions can be cut from a mass of the leaf and stalk material.

From experience it is known that the removal of leaf and stalk material in elongated portions from masses of such material involves considerable difficulties during unloading, conveying, storing and removing from silos and the like. However, the provision of the material in elongated rope-like form has special advantages, for example, in the feeding of animals because no expensive field operations are required such as chopping, pressing and the like.

It has been suggested to store the leaf and stalk material on a rotating bearing surface and to remove rope-like portions by means of driven disc-shaped cutting elements or moving cutting knives or chains, and to feed the removed material by conveyer elements.

It has been found that such cutting elements are not adequate in all cases, since they make only a single cut in the pile extending in a single plane. Accordingly, it is necessary to use a cutting element whose cutting range corresponds to the total height or depth of the leaf and stalk material, or to utilize two cutting elements associated with each other so that their cutting planes form an angle which permits a rope-like portion to be cut from the mass of material. Apart from the very considerable costs involved in such equipment, which cannot be afforded in such agricultural usages, there is also the disadvantage when using two cutting tools that they involve a complicated driving arrangement and full contact of the cutting portions is not possible, for example, when rotating cutting discs are used it is not possible to ensure a complete cutoff of a rope-like portion because of the only approximate contact provided between the cutting elements.

When a cutting element acting in a single plane is used, there is the disadvantage that the cutoff rope-like portion, and under certain circumstances the mass of material, is subject to considerable friction and, as a result, heating, because of the relatively rapidly rotating cutting disc. Further, when such a cutting disc is used there is a tendency for the material to wind up on the cutting equipment. Moreover, accumulations can also occur on the bearing if the cutoff material is not effectively severed by the cutting tool or if the bearing itself protrudes slightly into the path of revolution of the mass of material. Because of this problem, additional conveyer elements have been suggested to afford a reliable withdrawal of the separated rope-like portion from the mass. However, the use of conveyer units increases the construction costs and has a tendency to pull the rope-like portion apart which is harmful when the material is being removed in such elongated rope-like portions.

Another disadvantage involved in the attachment of conveyer elements adjacent the cutting tool is the added weight which must be displaced in the longitudinal or vertical movement of the cutting mechanism, for example, the weight of the different moving parts becomes too great and maintaining the proper relative spacing between the conveyer elements and the cutting tool provides a very difficult construction problem. Furthermore, in such an arrangement the danger that the leaf and stalk material becomes wound on the moving machine parts is considerably increased.

Therefore, the problem which exists in separating an elongated rope-like portion from a mass of leaf and stalk material involves not only achieving trouble-free and complete separation of the rope-like portion, but also in effecting simultaneous lateral withdrawal of the separated rope-like portion and the movement of the separated portion to an adjoining conveyer device while maintaining its continuous rope-like form. Accordingly, the present invention is directed to a very simple cutting device which separates a continuous rope-like portion from a mass of variable leaf and stalk material and withdraws a cut-off rope-like portion laterally from the mass or from the cutting tool and feeds it to an adjoining conveyer device, for example, a conveyer belt or a conveyer blower.

Additionally, the cutting device is also capable of cutting a mass of leaf and stalk material, fed in a rectilinear direction, into one or several rope-like portions and feeding such portions to an adjoining conveyer device.

Moreover, the cutting device is also capable of cutting rope-like portions from a mass of leaf and stalk material stored in a silo by mounting the cutting device on a movable support so that it can be positioned for selectively cutting continuous portions of the material.

Furthermore, the cutting device can also be designed to remove continuous rope-like portions from a preferably circular surface of a mass of the leaf and stalk material so that the cut portions can be directed laterally either to the center or to the outer edge of the mass material.

Therefore, in accordance with the present invention, the cutting device is formed as a hollow or cup-shaped body with its outer edge serving as a curvilinear cutting edge arranged symmetrically about an axis or rotation and the cutting tool being arranged relative to the mass of material so that the cutting edge separates the material along a circular or elliptic arc connecting the entrance point and the exit point of the cutting tool into and from the mass of material. In this arrangement the tangents to the cutting arc at the entrance point and the exit point are located in at least two imaginary planes which extend perpendicularly to one another.

Due to the curvilinear cutting arc provided by the cutting device, a "three-dimensional" rope-like portion is removed from the mass of material by the cutting tool and is directed along the surface of the tool so that a slight deformation is provided by the frictional contact between the separated material and the surface of the cutting tool. Such frictional contact causes the rope-like portion to experience some compression before it leaves the opposite side of the cutting tool from the side defining the cutting arc. Since the cutting tool is rotating and its surface along the cutting arc moves downwardly, then the surface along the opposite side is moving upwardly and imparts to the removed ropelike portion a certain rolling movement about its longitudinal axis. This effect is particularly advantageous in long fibered material, since individual stalks which tend to protrude laterally from the rope-like portion are directed or oriented in the longitudinal direction of the portion. In this arrangement the rope-like portion can be transferred trouble-free and continuously by means of the cutting tool or device from the mass of material to conveyer devices, for example, conveyer belts.

It is a characteristic of the cutting tool according to the present invention that it can be arranged to remove a rope-like portion from a rotating mass of material or from a stationary mass or from a mass of material which is directed rectilinearly relative to the cutting tool and in each instance the cutting tool directs the separated rope-like portion in a lateral direction away from the mass of material.

Furthermore, a plurality of the cutting tools can be arranged in spaced relationship, preferably with their axes of rotations arranged in parallel, for effecting the cutting action. With such an arrangement of multiple cutting tools a number of rope-like portions can be separated simultaneously from the mass of leaf and stalk material. This particular arrangement of the cutting tools is particularly advantageous for cutting pressed bales of material, since the pressed bales are fed to the cutting device on a conveyer belt and can be separated, in the longitudinal direction, into a number of rope-like portions which are removed laterally from the bale due to the arrangement of the multiple cutting tools. In such an arrangement, the individual separated portions are sufficiently loosened and prepared and can be transported for automatic feeding operations.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 2 is a perspective view of another embodiment of the cutting device, in accordance with the present invention, in which the mass of material is supported on a rotating bearing surface;

FIG. 3 is a perspective view of yet another embodiment of the present invention in which the cutting device includes a plurality of cutting tools mounted on a movable support with the mass of material located on a rotating bearing surface;

DETAILED DESCRIPTION OF THE INVENTION

Figure 1:
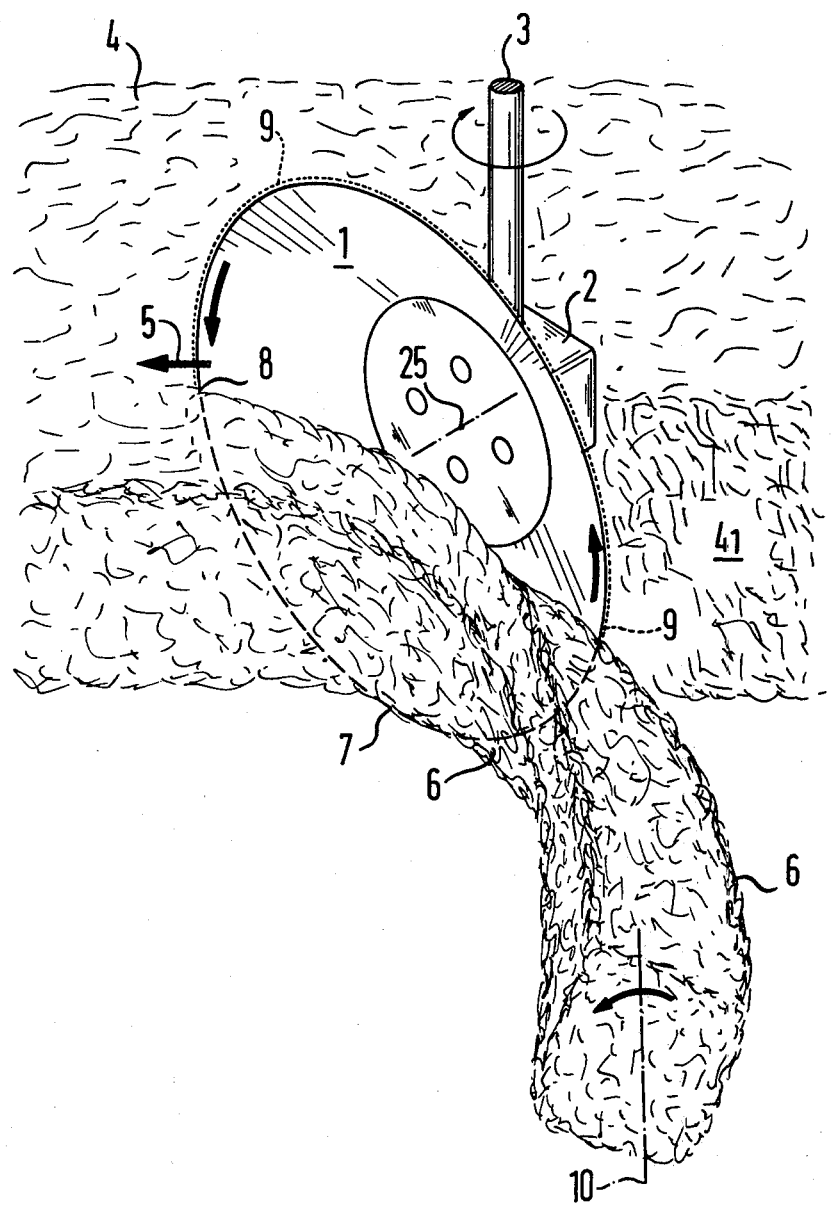
FIG. 1 is a perspective view of a cutting device in accordance with the present invention cutting into a mass of leaf and stalk material.

In FIG. 1 a cutting device as shown which includes a cutting tool 1 rotatably mounted to be driven by a miter gear 2 from a drive shaft 3. Preferably, the drive shaft 3 extends vertically upwardly above the mass of leaf and stalk material 4 so that the material cannot wind about the shaft as the cutting tool penetrates into the mass of material 4. The cutting tool 1 has a concave or cup-shaped surface facing into the mass of material. As the cutting tool 1 is moved into the material in the direction of the arrow 5, it rotates counterclockwise about its axis of rotation and removes a "three-dimensional" rope-like portion from the mass of leaf and stalk material 4. As it is separated, the rope-like portion 6 moves across the concave face of the cutting tool and is directed laterally away from the mass leaving the cutting surface on the opposite side from the location at which the cutting action takes place. The cutting tool has a symmetrically arranged cutting edge 9 which enters the mass of material 4 at the entrance point 8 and leaves the material at the exit point 7. Accordingly, a curvilinear arc is provided between the points 7 and 8 which may have a circular or elliptical configuration. The tangents to the cutting arc at the entrance point 8 and the exit point 7 each lie in imaginary planes which extend perpendicularly to one another. As can be noted from the arrows shown on the cutting surface of the tool 1, along the cutting arc 8–7 the cutting edge moves downwardly while on the opposite side of the cutting tool at which the ropelike portion 6 is directed outwardly, the cutting tool is moving upwardly and tends to turn the rope-like portion in the direction of the arrow shown about its longitudinal axis 10. This turning action permits the proper orientation of the rope-like portion 6 so that it can be placed on a conveyer belt or the like for further transportation.

In FIG. 2 the mass of leaf and stalk material is supported on a rotating surface 12 of a known type and the cutting tool 1₁ is supported on a boom 13 which can be moved in the horizontal and vertical directions for removing selected rope-like portions from the rotating mass on the surface 12. A drive 14 moves the boom 13 about the vertical axis 11 so that the cutting tool 1₁ can be moved into the mass of material from its periphery toward the center.

A parallel support construction 15 is provided on the boom 3 and serves to maintain a constant engagement angle of the cutting tool 1 with respect to the edge of the mass of material from which the rope-like portion 6 is cut. As the boom 13 is swung horizontally, the parallel construction 15 assures that the proper orientation of the cutting tool 1₁ is maintained for removing the proper section from the mass 4.

The velocity of movement of the boom 13 as it is pivoted about the vertical axis is preferably adjustable by means of a known regulating device on the drive 14 so that the optimum thickness of the rope-like portion 6 can be separated from the mass even where different leaf and stalk materials are involved and to assure a greater rope thickness at the center of the mass than at the periphery whereby a constant amount of material is separated and directed laterally from the cutting tool per unit of time.

In FIG. 2 another variation of the cutting tool 1₄ is shown in which a scanning cylinder 18 precedes the cutting tool in its direction of movement relative to the mass of material and the cylinder rolls along the edge of the mass at a selected distance from the cutting tool. By means of the scanning cylinder 18, the depth of penetration of the cutting tool $1_4$ into the mass 4 is set so that a positive control of the feeding movement by the drive 14 for the boom 13 is unnecessary.

Further, a scanning wheel 19 is arranged below and on an extension of the axis of rotation of the scanning cylinder 18 and rolls on the horizontal bearing surface 12 for the mass of material. Preferably, the scanning wheel is vertically adjustable and determines the vertical depth of penetration of the cutting into the mass of material and sets its distance from the rotating bearing surface 12.

To afford the vertical adjustability of the boom 13 a regulable lifting mechanism 17 is associated with it so that the cutting tool $1_1$ can be lowered selectively as the height of the mass of material on the surface 12 is lowered. In this arrangement the boom and cutting tool would be raised to commence cutting from the top of the mass of material and then moved gradually downwardly into succeeding horizontal cutting planes.

In the arrangement shown in FIG. 2, a travelling conveyer device can be arranged adjoining the cutting tool 1 for removing the rope-like portion both from the periphery of the rotating mass and from the inner portions of the mass as the cutting tool moves towards its center.

In FIG. 3 another embodiment of the present invention is illustrated with a plurality of spaced juxtaposed cutting tools or discs 1, $1_1$, $1_2$, and $1_3$ supported on a boom 13 and driven over a common drive 21. The cutting discs can be turned individually about their drive shafts for selectively adjusting the cutting angle of the individual discs and the boom 13 is arranged so that it can pivot horizontally about the vertical axis. Accordingly, the boom with the spaced discs can be pivoted from the lateral position 22 to any desired position above the mass of leaf and stalk material 4 supported on the surface 12. Further, the boom 13 can be locked in a desired radial position relative to the bearing surface so that the cutting tool 1 is located substantially above the vertical axis of the rotating bearing surface 12. In this position the boom can be lowered over an adjustable and regulable lifting mechanism 23 so that the cutting tools 1, $1_1$, $1_2$ and $1_3$ penetrate into the top of the mass of material 4.

The vertical lifting mechanism 23 can be driven by a driving motor 24 which also drives the rotating bearing surface 12.

As the mass of material is rotated relative to the cutting tools or discs ring-shaped rope-like portions 6, $6_1$, $6_2$, and $6_3$ are cut by the respective cutting discs from the surface of the mass of material 4 with the rope-like portions being withdrawn behind the next adjacent cutting disc, for example, rope-like portion 6 is withdrawn behind the cutting disc $1_1$.

After the mass of material 4 rotates through 360°, the rope-like portion 6 is directed into engagement with the next cutting tool $1_1$ and is removed with the rope-like portion $6_1$ and then continues its movement behind the next adjacent cutting disc $1_2$. This process repeats itself until all of the rope-like portions are combined in a multiple rope-like portion $6_4$ which is withdrawn laterally from the outer periphery of the bearing surface 12. Therefore, in contrast to the arrangement shown in FIG. 2, an additional conveyer device for directing the rope-like portions laterally outwardly is not required.

While the cutting device in FIG. 3 is shown with a rotating mass of material 4, it would be equally effective for cutting rope-like portions from a mass of material which is fed in a rectilinear manner to the cutting device without the need for any additional equipment.

Furthermore, the cutting device in FIG. 3 could be arranged to cut rope-like portions from masses of leaf and stalk material arranged in a stationary position, for example, in silos and from stacks of hay or straw. In such an arrangement the cutting device could be arranged to separate the rope-like portions either from the top or the side of the mass of material.

The cutting device, in accordance with the present invention, is also suitable for cutting pressed bales of material. The pressed bales can be fed through a feed duct by means of conveyer chains and the like to the cutting tools positioned in front of outlet openings from the duct so that the material is divided into individual sections.

Figure 4:
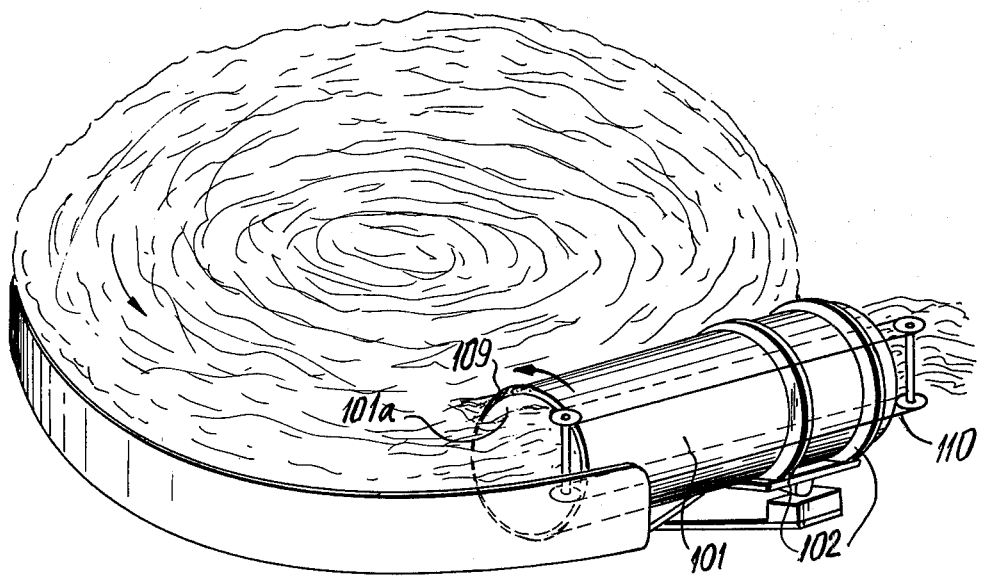
FIG. 4 is a perspective view, showing another embodiment of the invention utilizing a tubular cutting device.
Figure 5:
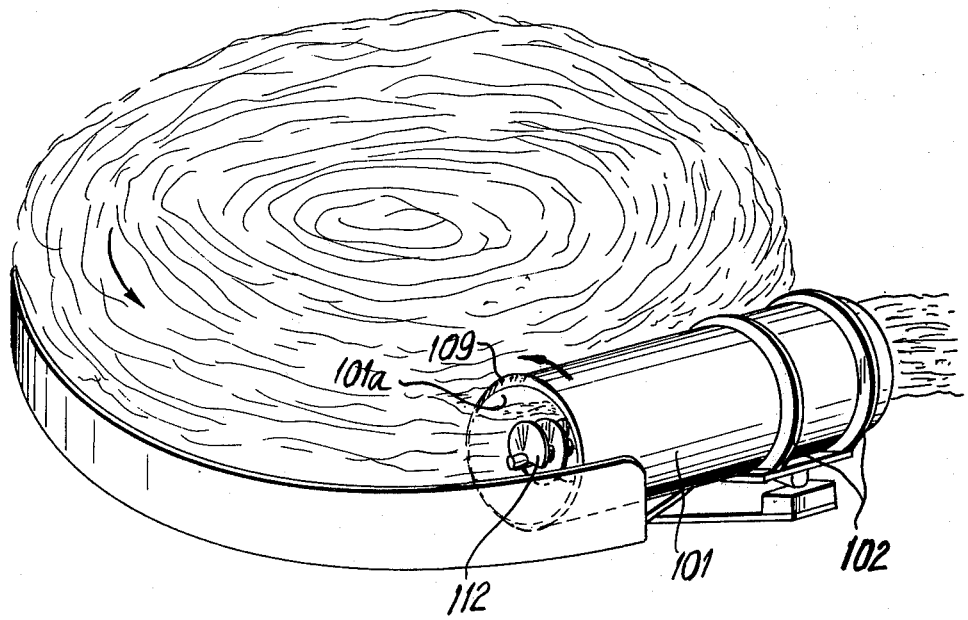
FIG. 5 is a perspective view, similar to FIG. 4, showing an alternative conveying arrangement for the tubular cutting device.

While the cutting tool has been shown in a disc-like or truncated conical shape, it can also have the form of a tubular or pipe-like member 101, note FIGS. 4 and 5 in which the material instead of passing across the surface of the tool, as shown in FIGS. 1, 2 and 3, passes through the opening 101a provided by the pipe-like member. One end of the tubular member 101 forms a cutting edge 109. Bearing means 102 rotatably support the outer surface of the tubular member 101. The interior 101a of the tubular member forms a passageway for the material separated by the cutting edge 109.

Figure 6:
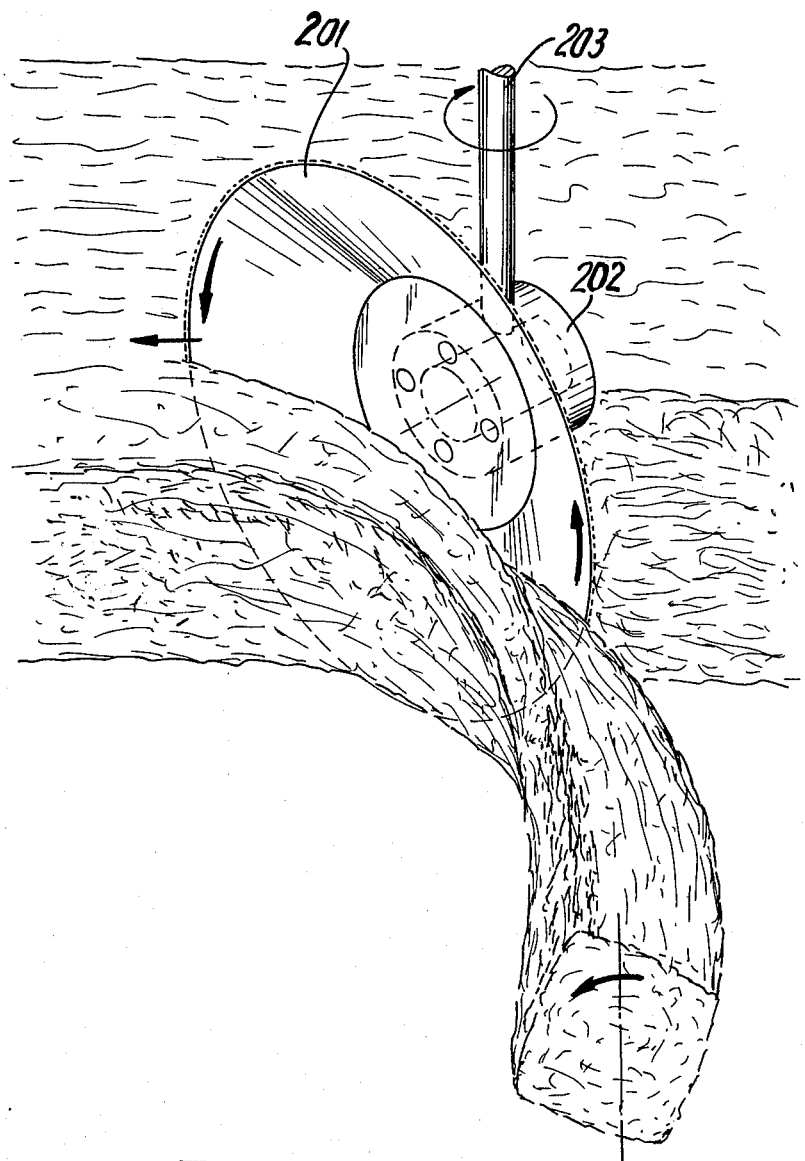
FIG. 6 is a perspective view of an alternative support arrangement for the cutting device.

In place of the arrangement illustrated in FIG. 1, the cutting tool 201 can be mounted on a hollow hub 202 with a rigid pivot member 203 for the hub, note FIG. 6.

Preferably, the circumferential velocity of the cutting edge of the cutting tool is between 15 and 40 m per second.

To provide the proper cutting action, the cutting edge of the tool can be formed with teeth or similar cutting elements.

As indicated above, various conveying means, for example, conveyer chains, worm-shaped ribs and the like, can be used in combination with the cutting tools for obtaining the proper conveyance of the rope-like portions from the mass of material.

While specific embodiments of the invention have been shown and described in detail to illustrate the application of the inventive principles, it will be understood that the invention may be embodied otherwise without departing from such principles.

What is claimed is:

1. A device for cutting an elongated rope-like portion from a mass of agricultural leaf and stalk material comprising a rotatable cutting tool, means for supporting and moving the mass of material along a path of travel, means for supporting and positioning said tool relative to the path of travel of the mass of material, means for rotating said tool about an axis, said means for supporting and positioning said tool relative to the mass of material being arranged to form an acute angle between the direction of movement of the mass of material and the axis of rotation of said tool, said cutting tool having an endless curvilinear cutting edge symmetrically arranged about the axis of rotation of and being located on the radially outer edge of said cutting tool and located in a flat plane, said cutting tool having a surface located radially inwardly from said cutting edge and extending angularly to the plane containing said cutting edge so that said surface trails said cutting edge as its moves into the mass of material and said cutting edge defines a curvilinear arc between its point of contact with and its point of exit from the mass of material.

2. A device, as set forth in claim 1, wherein said cutting tool has a cup-like shape with the interior surface of the cup-like shape extending concavely from said cutting edge and defining the surface across which the rope-like portion moves after it is separated from the mass of material by said cutting edge.

3. A device, as set forth in claim 1, wherein said cutting tool has a cup-like shape with the interior surface of the cup-like shape extending in a frusto-conical configuration from said cutting edge.

4. A device, as set forth in claim 1, wherein said cutting tool is a tubular member having a first end which forms its cutting edge and a second end spaced from its first end, bearing means rotatably supporting the outer surface of said tubular member and the interior of said tubular member forming a passageway through which the material separated from the mass of material by said cutting edge is conveyed.

5. A device, as set forth in claim 4, wherein conveyer elements are positioned in the interior of said tubular member for conveying the separated rope-like portion in a direction substantially parallel to the axis of rotation of said tubular member.

6. A device, as set forth in claim 5, wherein said conveyer elements are conveyer chains.

7. A device, as set forth in claim 5, wherein said conveyer elements are worm-shaped ribs.

8. A device, as set forth in claim 1, wherein said cutting edge of said cutting tool is provided with cutting teeth.

9. A device, as set forth in claim 1, wherein said means for rotating said cutting tool comprises a hollow hub, said cutting tool secured to said hollow hub, and a rigid pivot member for said hub.

10. A device, as set forth in claim 1, wherein said means for rotating said cutting tool comprises a centrally arranged driven cutting shaft.

11. A device, as set forth in claim 1, wherein said means for rotating said cutting tool includes drive means for rotating said cutting edge at a circumferential velocity of between 15 and 40m per second.

12. A device, as set forth in claim 1, wherein a plurality of said cutting tools are arranged in spaced relationship for cutting separate rope-like portions from the mass of material.

13. A device for cutting an elongated rope-like portion from a mass of agricultural leaf and stalk material comprises a rotatable cutting tool, means for supporting and positioning said tool relative to the mass of material, means for rotating said tool about an axis, said cutting tool having a curvilinear cutting edge symmetrically arranged about the axis of rotation of and being located on the radially outer edge of said cutting tool, said cutting tool having a surface extending from said cutting edge and located angularly to the plane containing said cutting edge so that said surface trails said cutting edge as it moves into the mass of material and said cutting edge defines a curvilinear arc between its point of contact with and its point of exit from the mass of material, a plurality of said cutting tools are arranged in spaced relationship for cutting separate rope-like portions from the mass of material, and the axes of rotation of said cutting tools are disposed in spaced parallel relationship.

14. A device, as set forth in claim 13, wherein said means for rotating said tool comprises a common drive for each of said cutting tools.

15. A device for cutting an elongated rope-like portion from a mass of agricultural leaf and stalk material comprises a rotatable cutting tool, means for supporting and positioning said tool relative to the mass of material, means for rotating said tool about an axis, said tool having a curvilinear cutting edge symmetrically arranged about the axis of rotation of and being located on the radially outer edge of said cutting tool, said cutting tool having a surface extending from said cutting edge and located angularly to the plane containing said cutting edge so that said surface trails said cutting edge as its moves into the mass of material and said cutting edge defines a curvilinear arc between its point of contact with and its point of exit from the mass of material, and said cutting tool has a concave surface extending radially inwardly from said cutting edge so that the rope-like portion cut from the mass of material passes over the rotating concave surface of said cutting tool for directing the portion laterally outwardly from said cutting tool and orienting the position of the material within the rope-like portion in the direction of the longitudinal axis of the portion.

16. A device for cutting an elongated rope-like portion from a mass of agricultural leaf amd stalk material comprising a rotatable cutting tool, means for supporting and positioning said tool relative to the mass of material, means for rotating said tool about an axis, said cutting tool having a curvilinear cutting edge symmetrically arranged about the axis of rotation of and located on the radially outer edge of said cutting tool, said cutting tool having a surface extending from the cutting edge and located angularly to the plane containing said cutting edge so that said surface trails said cutting edge and moves into the mass of material and said cutting edge defines a curvilinear arc between its point of contact with and its point of exit from the mass of material, said means for rotating said tool comprises an upwardly extending drive shaft, a miter gear attaches to the lower end of said drive shaft, and said cutting tool arranged to be rotated by said miter gear.

17. A device for cutting an elongated rope-like portion from a mass of agricultural leaf and stalk material comprising a rotatable cutting tool, means for supporting and positioning said tool relative to the mass of material, means for rotating said tool about an axis, said cutting tool having a curvilinear cutting edge symmetrically arranged about the axis of rotation of and being located on the radially outer edge of said cutting tool, said cutting tool having a surface extending from said cutting edge and located angularly to the plane containing said cutting edge so that said surface trails said cutting edge as it moves into the mass of material and said cutting edge defines a curvilinear arc between its point of contact with and its point of exit from the mass of material, said means for supporting and positioning said tool comprises a boom pivotally mounted to swing horizontally about a vertical axis, said cutting tool supported on said boom, and a rotating bearing surface for supporting the mass of leaf and stalk material so that by pivoting said boom said cutting tool can be displaced between the periphery of and the center of said rotating bearing surface for removing continuous rope-like portions in the mass of material supported thereon.

18. A device, as set forth in claim 17, wherein a parallel support construction is associated with said boom for maintaining a constant cutting angle for said cutting tool supported on said boom.

19. A device, as set forth in claim 17, wherein said means for supporting said tool includes means for pivoting said boom about the vertical axis.

20. A device, as set forth in claim 17, wherein said means for supporting said cutting tool includes a lifting mechanism associated with said boom for vertically adjusting the position of said cutting tool.

21. A device for cutting an elongated rope-like portion from a mass of agricultural leaf and stalk material comprising a rotatable cutting tool, means for supporting and positioning said tool relative to the mass of material, means for rotating said tool about an axis, said cutting tool having a curvilinear cutting edge symmetrically arranged about the axis of rotation of and being located on the radially outer edge of said cutting tool, said cutting tool having a surface extending from said cutting edge and located angularly to the plane containing said cutting edge so that said surface trails said cutting edge as it moves into the mass of material and said cutting edge defines a curvilinear arc between its point of contact with and its point of exit from the mass of material, a scanning tool positioned in front of said cutting tool in its direction of movement in the mass of material for adjusting the depth penetration of said cutting tool into the mass of material.

22. A device, as set forth in claim 21, wherein a scanning wheel is arranged on the axis of said scanning roll for maintaining the vertical depth of penetration of said cutting tool and the distance of said cutting tool from the surface supporting said mass of material.

23. A device, as set forth in claim 17, wherein a plurality of cutting tools are arranged in spaced relationship on said boom.

24. A device, as set forth in claim 23, wherein said means for supporting and positioning said cutting tools comprises means for displacing said boom about a vertical axis and for locking said boom in a radial position relative to the mass of leaf and stalk material.

25. A device for cutting an elongated rope-like portion from a mass of agricultural leaf and stalk material comprising a rotatable cutting tool, means for supporting and positioning said tool relative to the mass of material, means for rotating said tool about an axis, said cutting tool having a curvilinear cutting edge symmetrically arranged about the axis of rotation of and being located on the radially outer edge of said cutting tool, said cutting tool having a surface extending from said cutting edge and located angularly to the plane containing said cutting edge so that said surface trails the cutting edge as it moves into the mass of material and said cutting edge defines a curvilinear arc between its point of contact with and its point of exit from the mass of material, a drive shaft for each of said cutting tools, a driving mechanism and a common drive shaft connected to said driving mechanism and to said cutting tools for driving each of said drive shafts on said cutting tools.

26. A device, as set forth in claim 23, wherein a lifting and lowering mechanism is associated with said boom for vertically adjusting said cutting tools thereon relative to the mass of material from which the rope-like portions are cut.

27. A device, as set forth in claim 25, wherein means are associated with said cutting tools for adjusting the engagement angle of said cutting tools with said mass of material and for locking said cutting tools in place.

* * * * *